United States Patent
Schwarz et al.

(10) Patent No.: US 6,464,263 B1
(45) Date of Patent: Oct. 15, 2002

(54) CONNECTOR FOR A CORRUGATED PIPE WITH LOCKING PORTION

(75) Inventors: Ernst Schwarz, Voketswil; Roger Hüppi, Rapperswil, both of (CH)

(73) Assignee: PMA AG (CH)

( * ) Notice: Subject to any disclaimer, the term of this patent is extended or adjusted under 35 U.S.C. 154(b) by 0 days.

(21) Appl. No.: 09/525,374

(22) Filed: Mar. 15, 2000

(30) Foreign Application Priority Data

Mar. 16, 1999 (DE) .......................................... 199 11 724

(51) Int. Cl.[7] .................................................. F16L 37/00
(52) U.S. Cl. ...................................... 285/305; 285/903
(58) Field of Search .............................. 285/305, 903, 285/175, 332.4, 423

(56) References Cited

U.S. PATENT DOCUMENTS

| | | | | |
|---|---|---|---|---|
| 3,711,632 A | * | 1/1973 | Chirardi ................. 285/419 X |
| 4,368,904 A | * | 1/1983 | Lanz ............................ 285/175 |
| 4,443,031 A | * | 4/1984 | Borsh et al. ................. 285/419 |
| 4,723,796 A | * | 2/1988 | Nattel ..................... 285/305 X |
| 4,904,000 A | * | 2/1990 | Matsui ........................ 285/305 |
| 4,919,462 A | * | 4/1990 | Matsui et al. ............ 285/305 X |
| 5,015,013 A | * | 5/1991 | Nadin ..................... 285/903 X |
| 5,277,459 A | * | 1/1994 | Braun et al. ............. 285/903 X |
| 5,407,236 A | * | 4/1995 | Schwarz et al. .......... 285/903 X |
| 5,683,117 A | * | 11/1997 | Corbett et al. .......... 285/305 X |
| 5,782,502 A | * | 7/1998 | Lewis ..................... 285/305 X |
| D400,670 S | * | 11/1998 | Sorkin ........................ D23/393 |
| 5,964,483 A | * | 10/1999 | Long et al. .................. 285/305 |

* cited by examiner

Primary Examiner—Anthony Knight
Assistant Examiner—David E. Bochna
(74) Attorney, Agent, or Firm—Pennie & Edmonds LLP

(57) ABSTRACT

A corrugated-pipe connector has a locking portion with a lip on one side of the locking portion facing the corrugated pipe. The locking portion in the closed condition of the connector is opposite to an interlocking portion. The lip extends along the locking portion and for more than 180° C. of the corrugated pipe circumference between two adjacent corrugated pipe corrugations. The end portions of the lip are closer to each other relative to the symmetric plane than the furthest spaced apart inner contours of the lip which are opposite to each other.

20 Claims, 1 Drawing Sheet

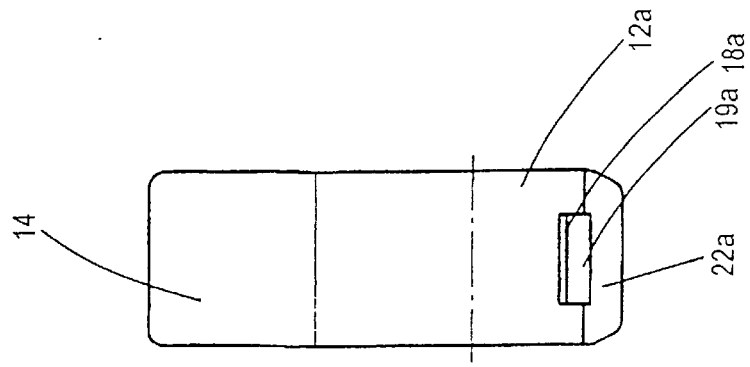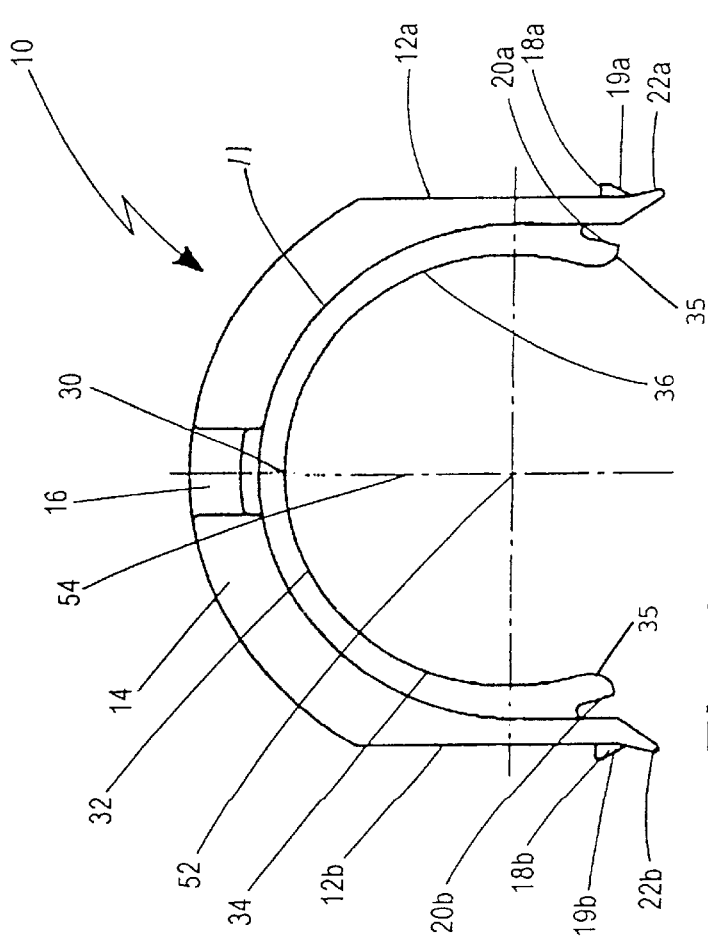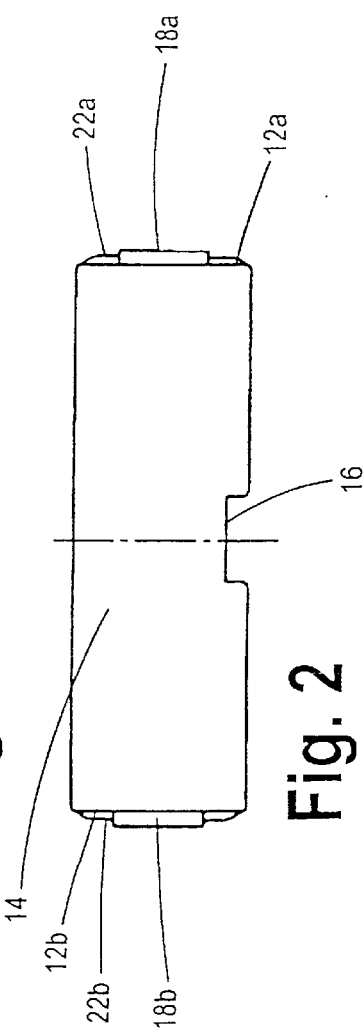

CONNECTOR FOR A CORRUGATED PIPE WITH LOCKING PORTION

FIELD OF THE INVENTION

The present invention relates to a connector for a corrugated pipe for the fastening of a corrugated pipe and having a locking portion which includes at least one lip on a side of the locking portion directed towards the corrugated pipe, whereby in the locked condition of the connector for a corrugated pipe an interlocking portion lies opposite the locking portion.

BACKGROUND ART

Such connector for a corrugated pipes are sufficiently known in the art and are manufactured and distributed by the applicant itself Such connector for a corrugated pipes are often constructed as click together ties, whereby the locking portion is most of the time C-shaped. The legs of the C-shaped locking portion are inserted into an interlocking portion and interlock with the latter, whereby the lip extends between the corrugation peaks of a corrugated pipe and thereby fastens the corrugated pipe within such a connector for a corrugated pipe.

Further known connector for a corrugated pipes include a locking portion which is connected with the interlocking portion by way of a hinge or a connecting web. Also, in those connector for a corrugated pipes several lips engage the corrugations of a corrugated pipe.

As already mentioned, several, which means at least two or three lips, are required in the known connector for a corrugated pipes, which must engage the corrugation valleys of a corrugated pipe to be fastened. For example, when the pipe in the region of the connector for a corrugated pipe is bent or when a pulling force is exerted on the pipe, at least two or three lips are required in the prior art connector for a corrugated pipe in order for the connector to sufficiently robustly connect with a corrugated pipe at very exact specifications, permanently, and as far as possible tear-off proof. As a result, corrugated pipes of only one single corrugated pipe profile can be sufficiently strongly fastened with a specific connector for a corrugated pipe.

SUMMARY OF THE INVENTION

It is therefore an object of the present invention to provide on one hand a connector for a corrugated pipe of versatile use, which on the other hand is especially equipped with a further improved holding force for the corrugated pipe.

The cited object is at least substantially achieved with a connector for a corrugated pipe with the features listed in claim 1.

Especially practical and advantageous embodiments are apparent from the dependent claims.

The advantages to be achieved in accordance with the invention are based on the lip on the locking portion extending so far that it extends over more than 180° C. of the corrugated pipe circumference between two adjacent corrugated pipe corrugations, whereby the lip portions are closer to one another relative to a plane of symmetry than the furthest spaced apart inner contours of the lip which are opposite to one another.

This means, especially in the lower end region of legs of the locking portion, the lip portions which are opposite to one another relative to the plane of symmetry are closer to one another than the regions of the lip which are opposite to the longitudinal axis of a fastened corrugated pipe.

The inner diameter of the lip can thereby be shaped evenly rounded or also linearly protrude or the like.

This enables an optimized force distribution onto the lip profile, especially at the end regions of the lips. An increased engagement pressure especially in the region in which such a connector for a corrugated pipe is normally pushed together can also be guaranteed.

Surprisingly, even when using a single lip, an increase in the rip out force of more than 30% can be achieved with this construction in accordance with the invention.

These surprising results are furthermore coupled with the circumstance that different profiles, especially fine or coarse profiles, of a corrugated pipe can be fastened in a connector for a corrugated pipe in accordance with the invention.

Of course, when giving up this last advantage, multiple lips can also be used in the connector for a corrugated pipe, for example, in order to provide an even higher holding force.

Advantageously, the lip extends symmetrically to a plane of symmetry or to a cylinder axis which extends in longitudinal direction of a fastened corrugated pipe. The lip thereby extends on one side at least by more than 90° C. in circumferential direction of the corrugated pipe. It is thereby essential that the lip in the lower region, which means in that region where the locking portion ends, does not extend linear, which means tangential to the pipe diameter, but follows the pipe diameter at least for a short region, which means in that region in which the lip extends by more than 90° C. in circumferential direction of the corrugated pipe, or at least partially approaches the pipe.

It is advantageous when the lip extends in circumferential direction of the pipe for more than 190° C., especially more than 200° C., for example, for 210° C., 220° C. or more.

In an additional region which lies beyond the 180° C. circumferential extent, the lip should radially inwardly extend further than in that region which is part of the 180° C. circumferential extent. The lip should thereby, as mentioned above, at least substantially approach or follow the outer circumference of the corrugated pipe in a corrugation valley in the additional region. The lip can thereby also be provided with a smaller diameter or circular section diameter than the associated corrugated pipe or the associated corrugated pipe within a corrugation valley, to be able to provide a compression between the outer circumference of the corrugated pipe and the lip of the locking portion.

Of course, radially inwardly the lip can be of different heights, which means, the lip itself can radially inwardly have a wavy profile, a toothed profile, or can be constructed otherwise. However, a continuous, linear lip profile is advantageous which at least substantially fits the outer diameter of a corrugated pipe in a corrugation valley.

Preferably, the inner partial radius of the lip is at least essentially even throughout, whereby the contour of the locking portion at the inner circumference of the locking portion to which the lip is connected can be at least substantially about oval. This has the effect that the required clearance can be created for providing the lip with different dimensions.

Although it is also possible to construct the locking portion and the lip asymmnetrically, it is very sensible for an easier handling to construct the locking portion symmetrical to a plane and to vary the progressively higher lip in its radial height symmetrically to both sides of the plane.

It is thereby especially essential that the height increases from the intersection of the plane of symmetry of the locking portion with the lip, which is also constructed symmetrically thereto.

Advantageously, the locking element has to legs with a connecting portion, whereby the legs together with the connecting portion serve as an elastic element, whereby the locking element can be interlocked with an interlocking portion by way of at least one detent portion.

The interlocking portion itself can also be provided with at least one lip, which corresponds to the lip on the locking element or is constructed as a continuation of that lip. It is also possible to provide one or more lips in the interlocking portion, whereby that lip or lips are staggered to the lip in the locking portion by the axial extent of at least one corrugated pipe corrugation. The locking portion can be connected with the interlocking portion by way of a connecting portion. This connecting portion can be realized, for example, in the form of a web or a film hinge or the like. In this manner, a connector for a corrugated pipe in accordance with the invention can possibly also be constructed as a connector for a corrugated pipe to be assembled by a swivel movement, whereby, however, according to the invention especially attention is given to a two-part connector for a corrugated pipe with separate locking portion and separate interlocking portion, since the advantages to be achieved according to the invention especially come into play here. It must particularly be noticed, that connector for a corrugated pipes with components connected through a film hinge have a point of weakness especially in region of the film hinge which is not present in a two-part connector for a corrugated pipe in accordance with the invention. Thus, when especially tear-out resistant connector for a corrugated pipes our required, one will always have to turn to a two-part connector for a corrugated pipe.

In the case of a two-part connector for a corrugated pipe, it is practical when the detent portions are provided on each of the legs which belong to the locking portion. The interlocking portion then has complementary recesses which correspond to the detent portions on the locking portion.

When a connector for a corrugated pipe is used in which the locking portion and interlocking portion are connected, the detent portion can be left out, since the opposite side is held by way of the film hinge, the connecting lip or the like. Otherwise is also possible, to provide a principally two-part realization of a connector for a corrugated pipe with the features according to the invention, with a connecting portion, which means, for example, a longer connecting web, for example, in order to permanently hold together the two components.

As already mentioned, it is especially advantageous to let the locking portion by way of its lip lie against the corrugated pipe, possibly under tension, and in the transition or overlap region between the locking portion and the interlocking portion, which means where the detent portions engage the interlocking portion. The corrugated pipe thereby has a somewhat smaller outer diameter than or the same outer diameter as the inner diameter of the lip in this region.

A spring portion is provided at the end region of the lip, so that the lip during pushing of the locking portion onto a corrugated pipe end can elastically give. To this end, a recess can be respectively provided at the end portions of the lip, so that in connection with the elastic properties of the material of which the connector for a corrugated pipe is normally manufactured, namely plastic, the lip can give way to the pipe, whereby at the same time also the elastic properties of the corrugated pipe can be used. However, since not only plastic corrugated pipes but also metal corrugated pipes can be fastened in the connector for a corrugated pipe in accordance with the invention, it can be efficient to arrange the elastic properties of the end portions of the lip in such a way that an elastic property of the corrugated pipe is not required.

It is well understood that the connector for a corrugated pipe in accordance with the present invention can be used as a connecting portion, for example onto a machine housing, which means a threaded connection or a bajonet connection extends from the interlocking portion. The connector for a corrugated pipe in accordance with the invention can also be used as a comer connection, a connector between two corrugated pipe ends, as a branch portion, or the like.

BRIEF DESCRIPTION OF THE DRAWINGS

The present invention will now be described in more detail by way of the attached figures with reference to a specific embodiment with features according to the invention. Further features, advantages and goals of the invention are thereby disclosed. It show in the drawings:

FIG. 1 a side view of the locking portion with features according to the invention;

FIG. 2 a top view of a locking portion according to FIG. 1; and

FIG. 3 an outer view of the locking portion according to FIG. 1 and 2.

DETAILED DESCRIPTION OF THE PREFERRED EMBODIMENT

Equal parts or parts at least of equal function are referred to in the FIGS. with the same reference number.

A locking portion 10 according to FIG. 1 includes two legs 12a, 12b, which are connected with one another by way of a connecting portion 14. A round or oval contour 11 advantageously results at the inner circumference of the body composed of the legs 12a, 12b and the connecting portion 14 from which the legs 12a, 12b tangentially extend. This contour can then be best pushed onto a corrugated pipe (not illustrated) radially to its cylindrical axis. This applies for round corrugated pipes. Corresponding, the shape must be adapted to the shape of corrugated pipes of other types, for example, oval corrugated pipes, cornered corrugated pipes or other types of corrugated pipes.

Detent portions 18a, 18b are respectively provided on the legs 12a, 12b by way of which the locking portion 10 can be fastened to an interlocking portion (not illustrated). The detent portions 18a, 18b include control guides 19a, 19b which lead to the legs 12a, 12b moving inwardly during insertion of the locking portion into the interlocking portion, so that then the detent portions 18a, 18b can engage in active connection with a cooperating shape or the detent shoulders on the interlocking portion. The end portions 22a, 22b of the legs 12a, 12b can be shaped and constructed so that they elastically engage a corresponding recess on the interlocking portion in order to transmit an additional holding force in this way.

A lip 30, 32, 34, 35, 36 extends along the inner region of the locking portion 10. The locking portion overall is symmetrical to a plane of symmetry 54, which means the point of intersection between the plane of symmetry 54 and the region 30 of the lip is the "zero point" of the lip from which the dimensions of the lip change symmetrically and evenly or from which their height increases evenly towards the end regions 34 of the lip.

The main axis of a corrugated pipe extends through a virtual center point 52, the center of the circle defined by the inner circumference 36 of the lip. The circle 36, which means the inner circumference of the lip, corresponds to a pipe diameter in a corrugation valley.

Starting from the zero point 30 of the lip, the height of the lip increases throughout the regions 32,34 and 35, starting from the body of the locking portion 10, which means the connecting portion 14 and the legs 12a, 12b.

The lip can thereby be constructed in such a way that it evenly engages corrugation valleys of a corrugated pipe, but this can also take place under tension, which means the height of the lip in the region 30 of the lip is less than the depth of the corrugation of a corrugated pipe, while in the region 35 the height of the lip is higher than the depth of the corrugation of the corrugated pipe. In this manner, the corrugated pipe can be braced relative to the lip or relative to the locking portion 10. However, this can lead to friction and to wear.

As is apparent, the lip is constructed in such a way that it engages the wall of a corrugated pipe in a corrugation valley over more than 180° C. which means beyond the virtual center point 52. For example, if the pipe is bent, increased contact pressure in the interlocking region of the locking portion automatically results so that a higher rip out force would be necessary for removal of the corrugated pipe. Further, this is combined with an additional leverage of the anchorage of the legs of the locking portion 10 within the interlocking portion (not illustrated). The rip out force can be increased by 30% and more by way of the illustrated oval shape of the lip or the oval height change of the lip. This very advantageous and surprising result can be achieved although instead of the normally two to three lips only a single lip is used. The use of only a single lip however guarantees that different pipe profiles, which means fine and course pipe profiles, can be fastened with the connector for a corrugated pipe in accordance with the invention.

The lip profile which is constructed according to the present invention guarantees an optimal force distribution even in extreme situations, which means when the pipe in the region of the connector for a corrugated pipe in accordance with the invention is highly bent, and thereby provides for an even more secure fastening of the pipe.

Recesses are provided at the end portions 35 of the lip which leads to the end portions of the lip having elastic properties. The recesses 20a, 20b can thereby be dimensioned in such a way that the end regions of the lip can radially outwardly give for an appropriate distance when a corrugated pipe is to be fastened, which means when the locking portion is pushed onto a corrugated pipe end.

FIG. 2 shows the locking portion 10 according to FIG. 1 from above. The rounded connecting portion 14 merges into the large straight-shaped legs 12a, 12b. The detent portions 18a, 18b extend from the legs 12a, 12b, below which the elastic regions 22a, 22b are visible.

FIG. 3 shows the locking portion constructed in accordance with the invention from the outside, whereby only the already described components are visible. In addition to the portions according to FIG. 2, the guide region 19a is visible through which the legs 12a, 12b are forced to avoid a corresponding complementary profile of the locking portion so that the legs 12a, 12b can engage a latch connection through the detent arrangements 18a, 18b.

What is claimed is:

1. A corrugated-tube connector for fixing a corrugated tube, comprising a first locking portion having at least one lip on one side of the first locking portion that faces the corrugated tube, the first locking portion being adapted to engage with a second locking portion lying opposite to the first locking portion in a closed state of the corrugated-tube connector, wherein:

the lip on the first locking portion extends continuously over more than 180° C. in the circumference of the corrugated tube and between two adjacent corrugations of the corrugated tube, and the end portions of the lip are closer to each other in relation to an axis of symmetry than those mutually opposite inner contours of the lip which are furthest apart.

2. The corrugated-tube connector according to claim 1, wherein the lip extends symmetrically with respect to a cylinder axis extending in the longitudinal direction of a fixed corrugated tube, the lip extending for more than 90° C. in the circumferential direction of the corrugated tube, at least on one side of the cylinder axis.

3. The corrugated-tube connector according to claim 1, wherein the lip extends for at least 190° C. in the circumferential direction of the corrugated tube.

4. The corrugated-tube connector according to claim 1, wherein the lip comprises a first and a second portion, the first lip portion extending further inwards in the radial direction than the second lip portion.

5. The corrugated-tube connector according to claim 4, wherein the first lip portion at least partially overlaps with at least one end portion of the lip.

6. The corrugated-tube connector according to claim 4, wherein the inner circumference of the first lip portion substantially conforms to the outer circumference of a corrugation valley in the corrugated tube.

7. The corrugated-tube connector according to claim 4, wherein the inner circumference of the first lip portion at least partially follows or corresponds to or is smaller than the outer circumference of a corrugation valley in the corrugated tube.

8. The corrugated-tube connector according to claim 1, wherein the lip has different heights in the radial direction.

9. The corrugated-tube connector according to claim 1, wherein the inner partial radius or radius of the lip is substantially uniform at all points.

10. The corrugated-tube connector according to claim 1, wherein the inner contour of the first locking portion is substantially oval, so that the outer portion of the lip adjoining the inner contour of the first locking portion is substantially oval.

11. The corrugated-tube connector according to claim 1, wherein the first locking portion is symmetrical about a plane, and the radial height of the lip varies symmetrically on both sides of the plane.

12. The corrugated-tube connector according to claim 11, wherein the height of the lip increases from the intersection of the symmetry plane and the lip.

13. The corrugated-tube connector according to claim 1, wherein the first locking portion comprises two legs joined together forming a body member of the first locking portion.

14. The corrugated-tube connector according to claim 1, wherein the first locking portion comprises a holding means for engaging with the second locking portion.

15. The corrugated-tube connector according to claim 14, wherein the holding means is adapted to engage with a connecting portion, a connecting web, or a film hinge.

16. The corrugated-tube connector according to claim 1, wherein the first locking portion rests on or against the corrugated tube by means of its lip in the region of the transition or intersection between the first locking portion and the second locking portion.

17. The corrugated-tube connector according to claim 1, wherein the first locking portion comprises a spring member positioned on at least one end portion of the lip.

18. A corrugated tube connector for fixing a corrugated tube, comprising:

a first locking portion having one side that faces the corrugated tube, the first locking portion being adapted to engage with a second locking portion in a closed state of the corrugated-tube connector, and at least one lip extending from the side of the first locking portion and continuously over more than 180° C. in the circumference of the corrugated tube; wherein the end portions of the lip are closer to each other than mutually opposite inner contours of the lip which are furthest apart.

19. The corrugated-tube connector according to claim 16, wherein the end portions of the lip extend further inwards in the radial direction than the remaining portion of the lip.

20. The corrugated-tube connector according to claim 16, wherein the inner circumference of the lip end portions substantially conform to the outer circumference of a corrugation valley in the corrugated tube.

* * * * *

UNITED STATES PATENT AND TRADEMARK OFFICE
CERTIFICATE OF CORRECTION

PATENT NO.    : 6,464,263 B1
DATED         : October 15, 2002
INVENTOR(S)   : Ernst Schwarz and Roger Hüppi It is certified that error appears in the above-identified patent and that said Letters Patent is hereby corrected as shown below:

<u>Column 5,</u>
Line 58, "dosed" should be -- closed --.

Signed and Sealed this

Ninth Day of December, 2003

JAMES E. ROGAN
*Director of the United States Patent and Trademark Office*